United States Patent [19]

Schutten et al.

[11] Patent Number: 4,459,532
[45] Date of Patent: Jul. 10, 1984

[54] H-SWITCH START-UP CONTROL FOR AC MOTOR

[75] Inventors: Herman P. Schutten; Robert W. Sackett, both of Milwaukee; Jan K. Sedivy, Elm Grove, all of Wis.

[73] Assignee: Eaton Corporation, Cleveland, Ohio

[21] Appl. No.: 402,863

[22] Filed: Jul. 29, 1982

[51] Int. Cl.³ .......................... H02P 1/26; H02M 5/02
[52] U.S. Cl. ..................................... 318/781; 318/808; 363/149
[58] Field of Search ............... 318/781, 799, 798, 768, 318/797, 746, 747, 816, 809, 810, 807, 812, 767; 363/149, 152, 151, 157, 159–163, 165; 307/513, 262; 323/212, 217

[56] References Cited

U.S. PATENT DOCUMENTS 4,117,364 9/1978 Baker .......................... 318/781 X
4,330,741 5/1982 Nagase ........................... 318/809

Primary Examiner—G. Z. Rubinson
Assistant Examiner—Patrick Keane
Attorney, Agent, or Firm—Andrus, Sceales, Starke & Sawall

[57] ABSTRACT

A start-up control technique is disclosed for an AC motor. At least one H-switch connects a motor winding to a pair of AC-supplied power lines and is switched between designated states to yield a fundamental frequency component voltage waveform in the winding phase shifted from the voltage waveform in another winding. A rotating field is provided for start-up, without energy-storage phasing capacitors or inductors.

32 Claims, 8 Drawing Figures

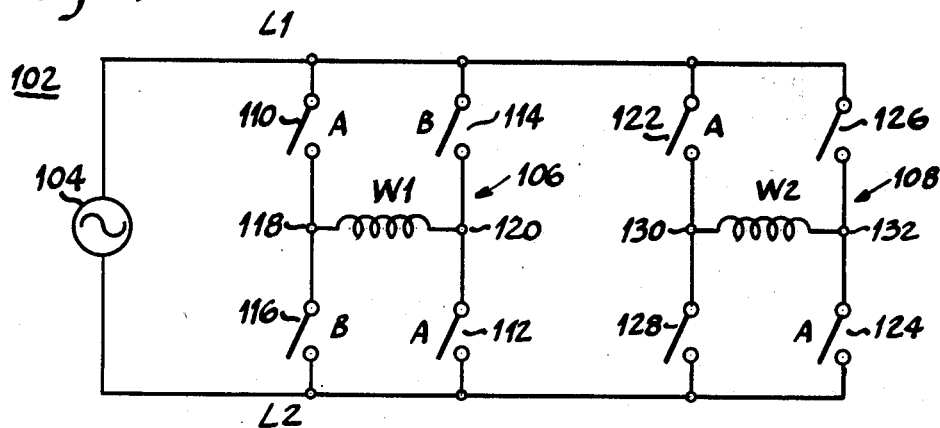
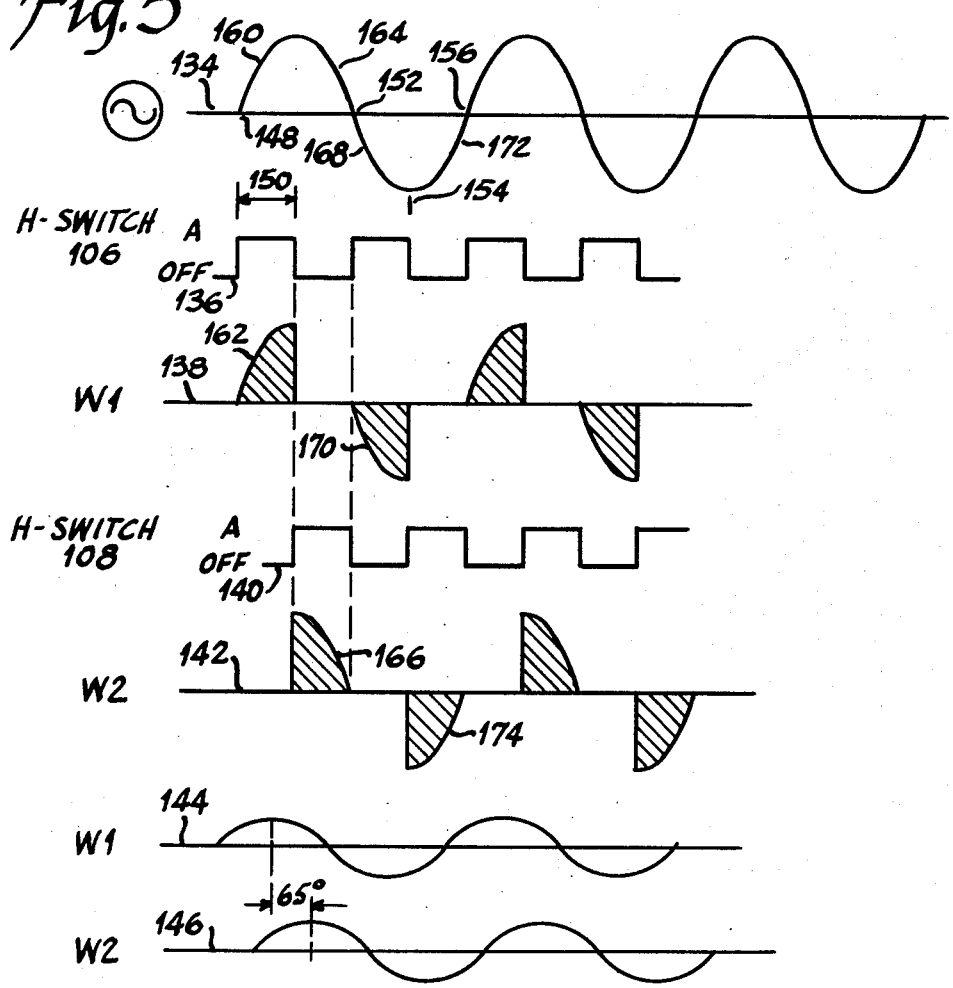

H-SWITCH START-UP CONTROL FOR AC MOTOR

TECHNICAL FIELD

The invention relates to start-up techniques for AC motors by providing phase shifted fields in the motor windings, to thus provide a rotating magnetic field during start-up.

BACKGROUND AND SUMMARY

Various techniques are known for establishing a rotating field in an AC motor by providing phase shifted fields in separate windings. Numerous systems are known for providing the phase shift, including various combinations of resistors, capacitors or inductors to store electrical energy and then release it as phase shifted alternating current.

The present invention enables the use of one or more H-switches to provide the desired phase shift for the motor, without energy-storage phasing capacitors or inductors.

H-switches are commonly used in converter-inverters, and cycloconverters, e.g. for frequency conversion. The present invention provides a particularly simple and effective technique for using H-switches to afford the requisite phase shift for starting an AC motor.

BRIEF DESCRIPTION OF THE DRAWINGS

FIG. 4 is a schematic circuit diagram for illustrating an alternate start-up control technique in accordance with the invention.

FIG. 5 is a timing diagram illustrating operation of the circuit of FIG. 4.

DETAILED DESCRIPTION

Figure 1:
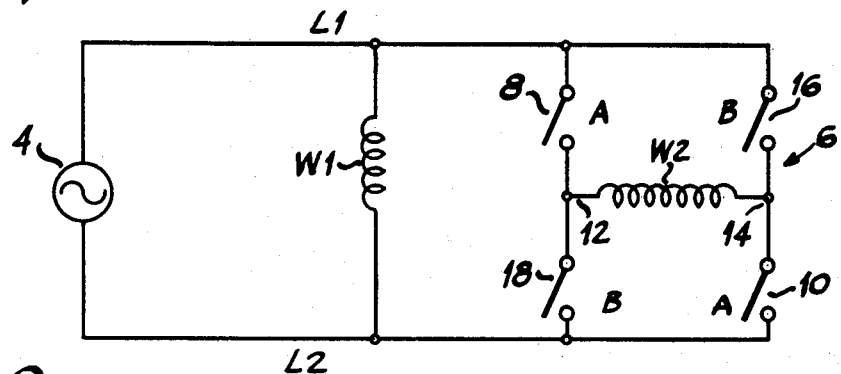
FIG. 1 is a schematic circuit diagram for illustrating the start-up control technique of the present invention.

There is shown in FIG. 1 an AC motor control circuit 2 having a pair of power lines L1 and L2 supplied by a single phase AC source 4. A first motor winding W1 is connected to L1 and L2. A second motor winding W2 is connected by an H-switch 6 to L1 and L2. H-switches are well known, and commonly used in cycloconverters. H-switch 6 has one ON state A in which switches 8 and 10 are closed and switches 16 and 18 are open, such that L1 is connected to the left end 12 of winding W2, and L2 is connected to the right end 14 of W2. H-switch 16 has another ON state B in which switches 8 and 10 are open and switches 16 and 18 are closed, such that L2 is connected to the left end 12 of W2 and L1 is connected to the right end 14 of W2. H-switch 16 has an OFF state in which each of switches 8, 10, 16 and 18 is open such that W2 is disconnected from AC source 4. Alternatively, any one of switches 8, 10, 16 or 18 can remain closed, or the two switches 8 and 16 can remain closed, or the two switches 10 and 18 can remain closed during the OFF state of H-switch 6, and W2 will still be disconnected from AC source 4. Many H-switches require a snubber circuit (now shown) in parallel with the load, such as W2, for transient suppression and voltage spike protection during the OFF state.

The present invention provides a start-up control technique comprising switching H-switch 6 between one and the other of its ON states according to a designated pattern to yield a resultant voltage waveform in W2 phase shifted from the voltage waveform in W1, without energy-storage phasing capacitors or inductors.

Figure 2:
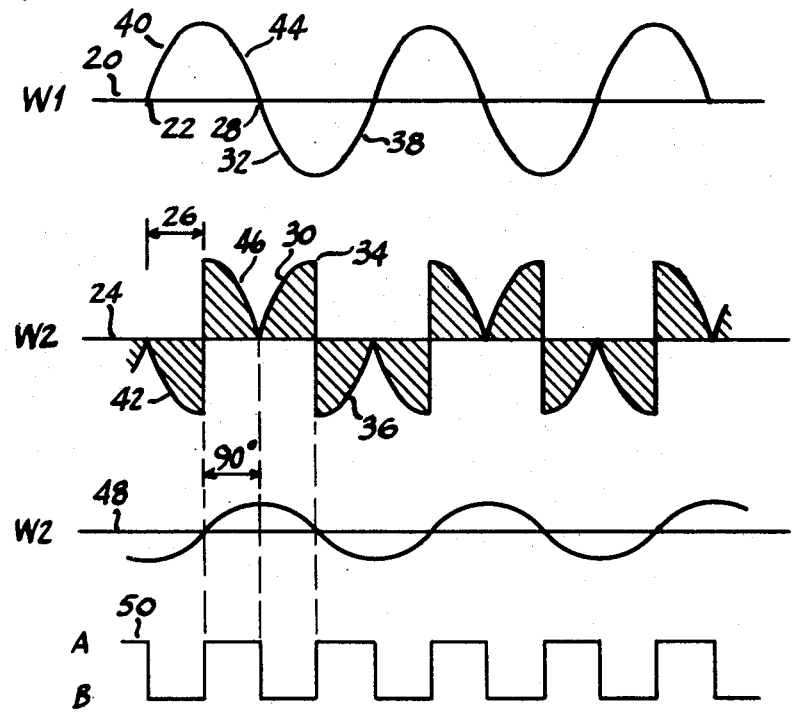
FIG. 2 is a timing diagram illustrating operation of the circuit of FIG. 1.

In the timing diagram of FIG. 2, timing line 20 shows the AC signal from source 4, which appears across W1. At zero crossing 22, H-switch 6 is switched to its other ON state B with switches 16 and 18 closed to thus connect L1 to the right end of W2 and connect L2 to the left end of W2. The waveform segment 42 in W2 as shown on timing line 24 is thus the inversion of the waveform segment 40 in W1. After a given delay 26, which is preferably equal to about a quarter cycle of the AC source, H-switch 6 is switched OFF briefly and then switched back to its one ON state A with switches 16 and 18 open, and switches 8 and 10 closed. This connects L1 to the left end of W2 and connects L2 to the right end of W2. The waveform segment 46 in W2 is thus the same as like-going waveform segment 44 in W1. At the first successive next zero crossing 28 of the AC signal, H-switch 6 is toggled, and switches from ON state A momentarily through an OFF state to ON state B such that L1 is connected to the right end of W2 and L2 is connected to the left end of W2. The waveform segment 30 in W2 is thus the inversion of the waveform segment 32 in W1, i.e. as waveform segment 32 falls from zero, waveform segment 30 rises from zero. After the given delay following zero crossing 28, H-switch 6 again switches at time point 34 to its other ON state B such that waveform segment 36 in W2 corresponds to a like-going waveform segment 38 in W1 and rises towards zero.

In one form H-switch 6 is cyclically and alternately switched between said one and said other ON states at twice the frequency of AC input signal zero crossings of AC source 4. H-switch 6 is switched to its other ON state B at each zero crossing of the AC signal. H-switch 6 is switched to its one ON state A after given delay 26 following each zero crossing and before the next successive zero crossing. In this form, delay 26 is equal to about one-fourth of a period of the AC signal from source 4, i.e. is equal to approximately a quarter cycle of the AC signal.

As seen on timing lines 20 and 24, the rising from zero first quarter cycle waveform 40 in W1 corresponds to an opposite-going falling from zero first quarter cycle chopped waveform 42 in W2. The second quarter cycle falling toward zero waveform 44 in W1 corresponds to a like-going falling toward zero second quarter cycle chopped waveform 46 in W2. The third quarter cycle falling from zero waveform 32 in W1 corresponds to an opposite-going third quarter cycle rising from zero chopped waveform 30 in W2. The fourth quarter cycle rising towards zero waveform 38 in W1 corresponds to a like-going fourth quarter cycle rising towards zero chopped waveform 36 in W2. The second and fourth quarter cycle chopped waveforms 46 and 36 in W2 are the same as 44 and 38 in W1. The first and third quarter cycle chopped waveforms 42 and 30 in W2 are the inversions of the waveforms 40 and 32 in W1.

The fundamental frequency component of the various chopped segments on timing line 24 is shown on timing line 48. The resultant waveform on line 48 is shifted by 90° from the waveform in W1 on line 20. This 90° phase shift between windings W1 and W2 provides the rotating field for motor start-up.

Timing line 50 in FIG. 2 shows the timed switching control for toggling H-switch 6 between its one ON state A and its other ON state B. This switching signal toggles at twice the frequency of AC input signal zero crossings of the AC source, such that the resultant voltage waveform in W2 is 90° out of phase with the voltage waveform in W1. This is accomplished without energy-storage phasing capacitors or inductors.

Figure 3:
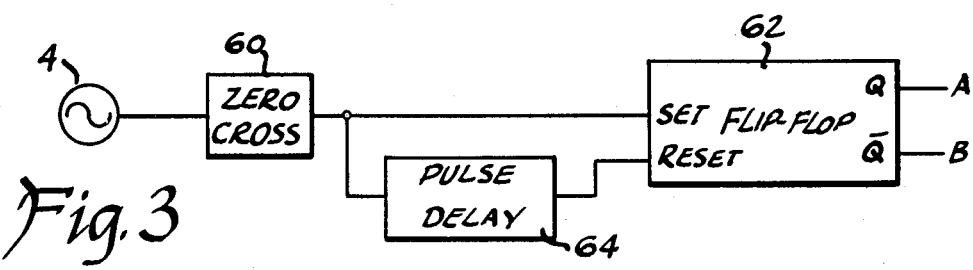
FIG. 3 is a schematic circuit diagram illustrating the timing control for the circuit of FIG. 1.

FIG. 3 shows timing control circuitry for H-switch 6 of FIG. 1. A zero crossing detector 60 generates an output pulse in response to each zero crossing of the AC signal from source 4 and toggles a flip-flop 62 between its Q and $\overline{Q}$ outputs to switch between ON states A and B. Flip-flop 62 is also toggled by the output of zero cross detector 60 after delay 26 as provided by pulse delay 64. This pulse delay is preferably chosen to be a quarter cycle, 90°, of the AC signal such that flip-flop 62 is toggled at each zero crossing and also at approximately the mid-point between each zero crossing, resulting in the timed toggling signal 50, FIG. 2.

FIG. 4 shows another motor control circuit 102 having a pair of power lines L1 and L2 supplied by an AC source 104. First and second motor windings W1 and W2 are connected respectively by first and second H-switches 106 and 108 to L1 and L2.

H-switch 106 has one ON state A in which switches 110 and 112 are closed and switches 114 and 116 are open such that L1 is connected to the left end 118 of W1 and L2 is connected to the right end 120 of W1. H-switch 106 has another ON state B in which switches 110 and 112 are open and switches 116 and 114 are closed such that L2 is connected to the left end 118 of W1 and L1 is connected to the right end 120 of W1. H-switch 106 has an OFF state in which each of switches 110, 112, 114 and 116 is open such that W1 is disconnected from AC source 104. Alternatively, as before, any one of switches 110, 112, 114 and 116 can remain closed, or the two switches 110 and 114 can remain closed or the two switches 116 and 112 can remain closed during the OFF state of H-switch 106, and W1 will still be disconnected from AC source 104.

H-switch 108 has one ON state A in which switches 122 and 124 are closed and switches 126 and 128 are open such that L1 is connected to the left end 130 of W2 and L2 is connected to the right end 132 of W2. H-switch 108 has another ON state B in which switches 122 and 124 are open and switches 128 and 126 are closed, such that L2 is connected to the left end 130 of W2 and L1 is connected to the right end 132 of W2. H-switch 108 has an OFF state in which switches 122, 124, 126 and 128 are all open, thus disconnecting winding W2 from AC source 104. Alternatively, any one of switches 122, 124, 126, and 128 can remain closed, or the two switches 122 and 126 can remain closed, or the two switches 128 and 124 can remain closed during the OFF state of H-switch 108, and W2 will still be disconnected from AC source 104. Each of the H-switches 106 and 108 may include snubber circuit means as noted above.

It is preferred that in the OFF state the energy inductively stored in the winding be allowed to gradually decrease by freewheeling. For example, when H-switch 108 switches from its one ON state A to its OFF state, switches 128 and 124 are closed to provide a short circuit around the winding and allow the freewheeling gradual decrease of inductively stored energy therethrough from the winding. This freewheeling is known in the art.

In the timing diagram in FIG. 5, timing line 134 shows the AC signal from source 104. Timing line 136 shows the toggling of H-switch 106 to switch between its one ON state A and its OFF state. This results in the chopped waveform shown on timing line 138 in winding W1. Timing line 140 shows the toggling of H-switch 108 to switch between its one ON state A and its OFF state. This results in the chopped switched waveform in W2 shown on timing line 142. The fundamental frequency component of the chopped waveform segments on timing line 138 is shown in line 144 for W1. The fundamental frequency component of the chopped waveform segments in W2 on timing line 142 is shown in line 146. The resultant waveform in W2 on line 146 is approximately 65° out of phase with the resultant waveform in W1 on line 144. This phase shift provides the rotating field for motor start-up, and is accomplished without energy-storage phasing capacitors or inductors.

Referring to FIG. 5, H-switch 106 is switched to its ON state A and H-switch 108 is switched to its OFF state at a zero crossing 148 of the AC signal. Then after a given delay 150 and before the first successive next zero crossing 152, H-switch 106 is switched to its OFF state and H-switch 108 is switched to its ON state A. Then at the first successive next zero crossing 152, H-switch 106 is switched back to its ON state A and H-switch 108 is switched back to its OFF state. Then after another given delay following zero crossing 152, the H-switches are again toggled at 154 such that H-switch 106 switches to its OFF state and H-switch 108 switches to its ON state A. Then at the second successive zero crossing 156, the H-switches are again toggled and H-switch 106 switches to its one ON state A and H-switch 108 switches to its OFF state, and so on.

In the operation illustrated in FIG. 5, the other ON state B of H-switches 106 and 108 is not used. In an alternative, the H-switches are toggled between their OFF states and their B ON states, without using the A ON state. In another alternative, either one of the H-switches is toggled between its OFF state and its B ON state, while the other H-switch remains as described in the preceding paragraph. This latter alternative provides an opposite rotating field for motor start-up in the reverse direction.

In one form, delay 150 is equal to one quarter of a period of the AC signal, i.e. the delay equals a quarter cycle of the AC signal. H-switches 106 and 108 are cyclically and alternately toggled in opposition between ON state A and the OFF state at twice the frequency of AC input signal zero crossings. As seen in FIG. 5, the first quarter cycle waveform 160 of the AC signal corresponds to a like-going first quarter cycle chopped waveform 162 in W1. The second quarter cycle waveform 164 of the AC signal is provided as a like-going second quarter cycle chopped waveform 166 in W2. The third quarter cycle waveform 168 of the AC signal is provided as a like-going third quarter cycle chopped waveform 170 in W1. The fourth quarter cycle waveform 172 of the AC signal is provided as a like-going fourth quarter cycle chopped waveform 174 in W2. The first and third quarter cycle waveform segments of the AC signal are thus provided as like-going quarter cycle chopped waveforms in W1. The second and fourth quarter cycle waveform segments of the AC signal are provided as like-going chopped quarter cycle waveforms in W2.

Figure 6:
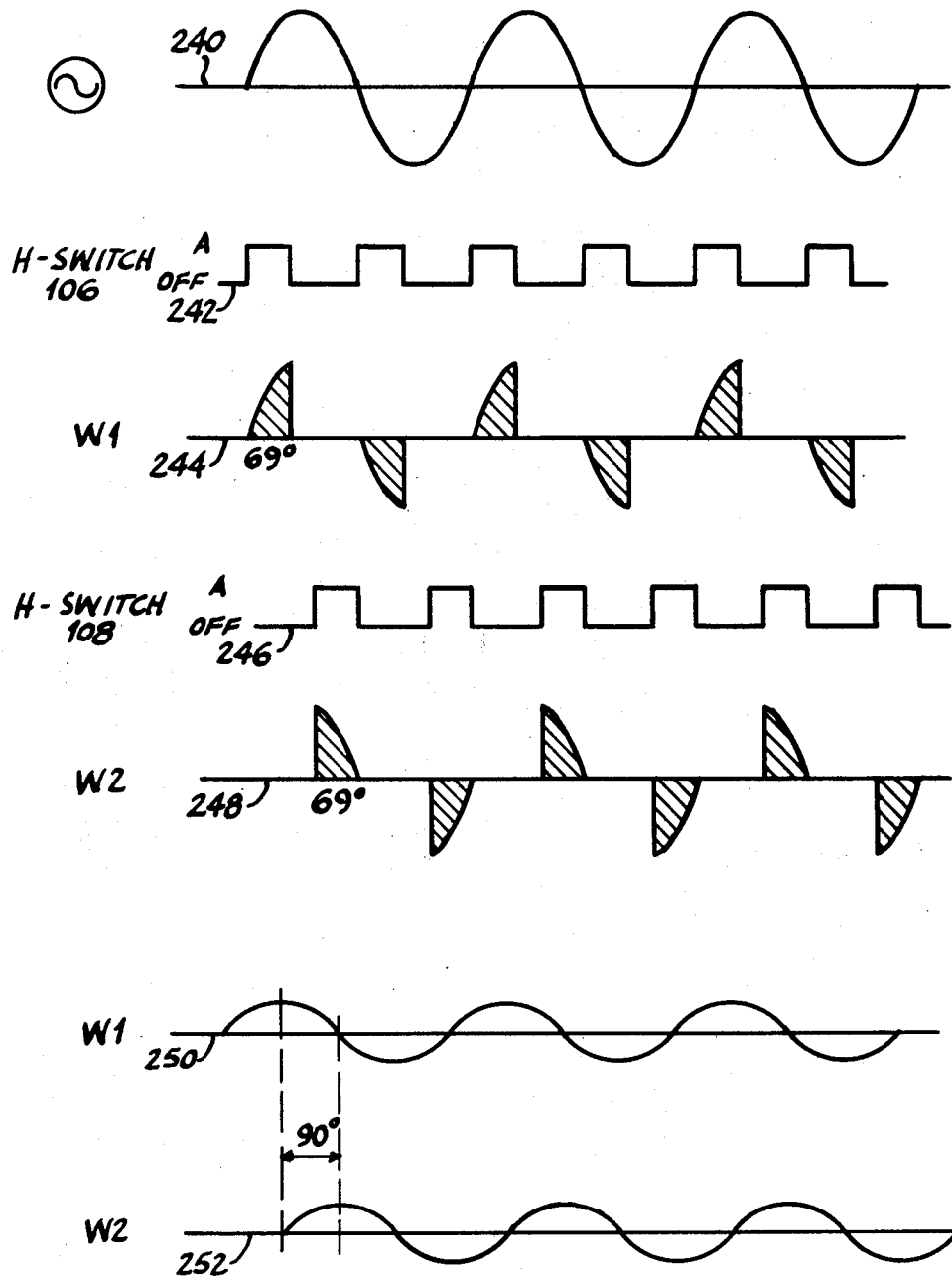
FIG. 6 is a timing diagram illustrating alternative operation of the circuit of FIG. 4.

FIG. 6 shows alternative operation of motor control circuit 102 of FIG. 4. Timing line 240 shows the AC signal from source 104. Timing line 242 shows the toggling of H-switch 106 to switch between its one ON state A and its OFF state, resulting in the chopped waveform shown on timing line 244 in winding W1 which is energized for 69° following a zero crossing of the AC signal. Timing line 246 shows the toggling of H-switch 108 to switch between its one ON state A and its OFF state, resulting in the chopped switched waveform in W2 shown on timing line 248 which is energized for 69° preceding the next zero crossing of the AC signal. As seen in FIG. 6, for the first half cycle of the AC signal, winding W1 is energized for the first 69°, then both H-switches are OFF for 42°, and then winding W2 is energized for the remaining 69° of the first half cycle, and so on. The fundamental frequency component of the chopped waveform segments on timing line 244 is shown in line 250; and the fundamental frequency component of the chopped waveform segments in W2 on timing line 248 is shown on line 252. The resultant waveform in W2 on line 252 is approximately 90° out of phase with the resultant waveform in W1 on line 250. This phase shift provides the rotating field for motor start-up, and is accomplished without energy-storage phasing capacitors or inductors.

Figure 7:
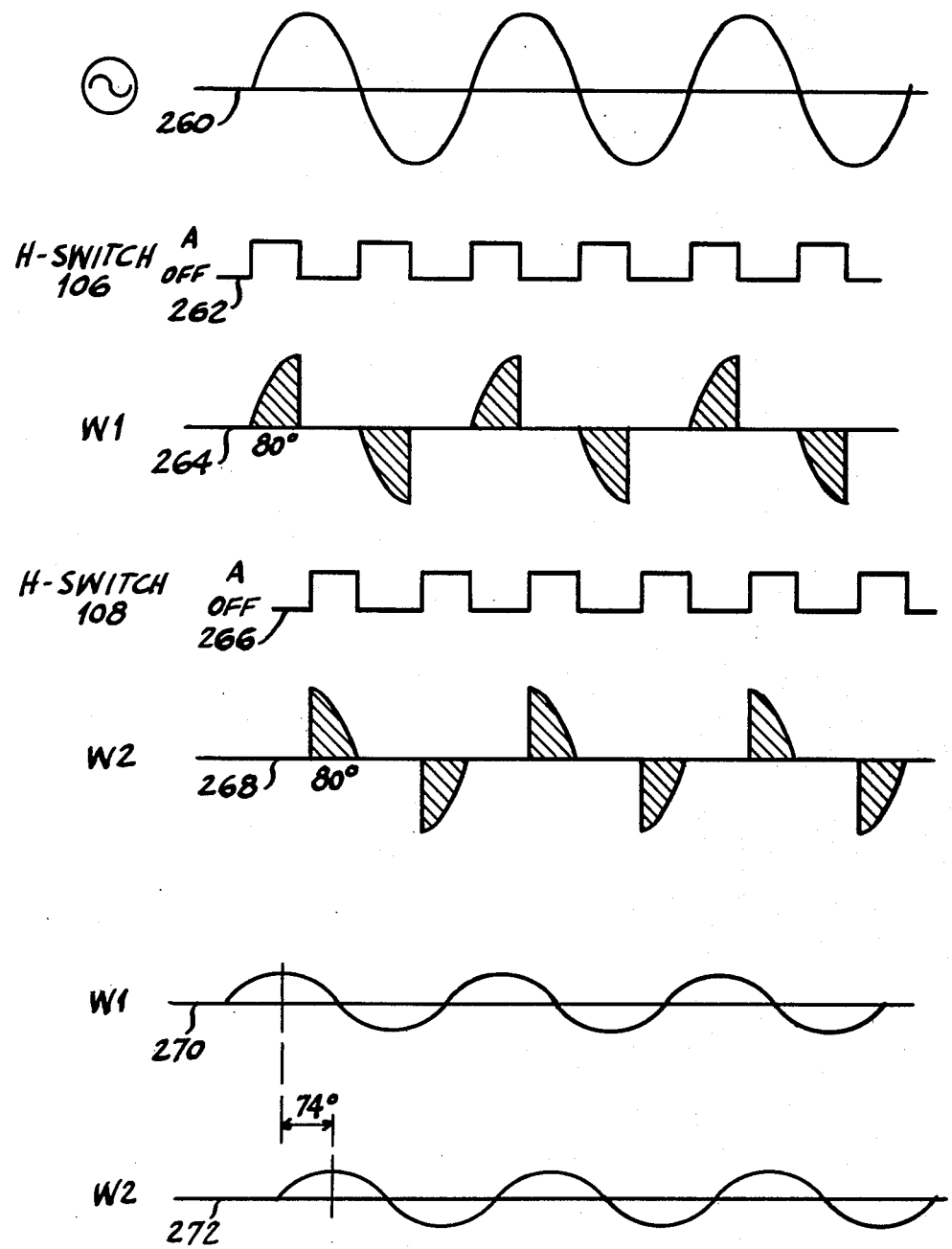
FIG. 7 is a timing diagram illustrating further alternative operation of the circuit of FIG. 4.

FIG. 7 shows the preferred operation of motor control circuit 102 of FIG. 4. Timing line 260 shows the AC signal from source 104. Timing line 262 shows the toggling of H-switch 106 to switch between its one ON state A and its OFF state, resulting in the chopped waveform shown on timing line 264 in winding W1 energized for 80° following a zero crossing of the AC signal. Timing line 266 shows the toggling of H-switch 108 to switch between its one ON state A and its OFF state, resulting in the chopped switched waveform on timing line 268 in winding W2 energized for 80° preceding the next zero crossing of the AC signal. As seen in FIG. 7, for the first half cycle of the AC signal, winding W1 is energized for the first 80°, and then both H-switches are OFF for 20°, and then winding W2 is energized for the remaining 80°, and so on. The fundamental frequency component of the chopped waveform segments on timing line 264 is shown on line 270; and the fundamental frequency component of the chopped waveform segments in W2 on timing line 268 is shown on line 272. The resultant waveform in W2 on line 272 is approximately 74° out of phase with the resultant waveform in W1 on line 270. This phase shift provides the rotating field for motor start-up, and has been found to provide the optimum combination of phase shift and start-up torque.

Figure 8:
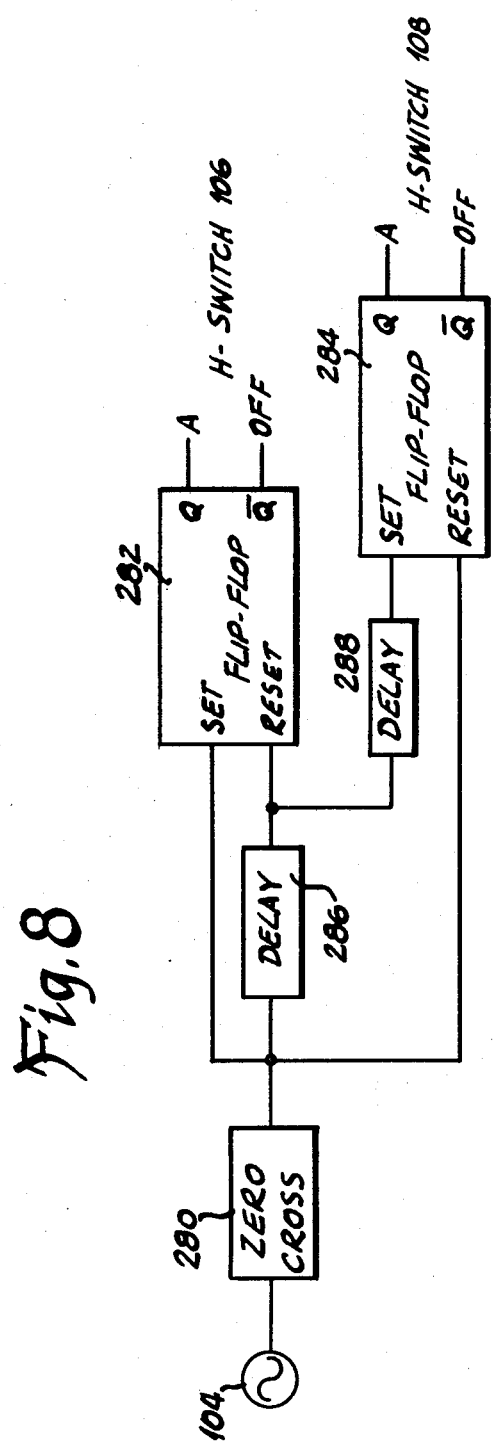
FIG. 8 is a schematic circuit diagram illustrating the timing control for the circuit of FIG. 4.

FIG. 8 shows timing control circuitry for H-switches 106 and 108 of FIG. 4 for operation in accordance with FIGS. 5, 6 or 7. A zero crossing detector 280 generates an output pulse in response to each zero crossing of the AC signal from source 104 and toggles flip-flops 282 and 284 between their Q and $\overline{Q}$ outputs to switch between their ON states A and their OFF states. Flip-flop 282 is also toggled after a delay provided by pulse delay 286, and flip-flop 284 is also toggled after a further delay provided by pulse delay 288. In operation, a zero crossing of the AC signal sets flip-flop 282 such that its Q output goes high and H-switch 106 is switched to its ON state A, energizing winding W1. After a given delay provided by 286, for example 80° as in FIG. 7, flip-flop 282 is reset such that its Q output goes low and its $\overline{Q}$ output goes high and H-switch 106 is switched to its OFF state. Both H-switchs are now OFF. After a further delay provided by 288, for example 20° as in FIG. 7, flip-flop 284 is set such that its Q output goes high and H-switch 108 is switched to its ON state A, energizing winding W2. At the next zero crossing, for example 80° later as in FIG. 7, flip-flop 284 is reset and its Q output goes low and its $\overline{Q}$ output goes high such that H-switch 108 is switched to its OFF state. For the operation in FIG. 6, delay 286 provides a 69° delay, and delay 288 provides an additional 42° delay. For the operation in FIG. 5, delay 286 provides approximately 90° delay, and delay 288 provides only a momentary delay.

In another alternative, delay 288 may have its input connected directly to zero crossing detector 280, and delay 286 may have a longer duration than delay 288, such that flip-flop 284 is set before flip-flop 282 is reset. This results in a small period during which both H-switches are ON, for example for a few degrees.

It is recognized that various modifications are possible within the scope of the appended claims.

We claim:

1. A start-up control method for an AC motor control circuit having a first winding W1 connected to a pair of power lines L1 and L2 supplied by an AC source, and having a second motor winding W2 connected by an H-switch to L1 and L2, said H-switch having one ON state connecting L1 to the left end of W2 and connecting L2 to the right end of W2, said H-switch having another ON state connecting L2 to the left end of W2 and connecting L1 to said right end of W2, said start-up control method comprising switching said H-switch between said one and said other ON states, without energy-storage phasing capacitors or inductors, to yield a fundamental frequency component voltage waveform in W2 phase shifted from the voltage waveform in W1, and comprising switching said H-switch to said other ON state at a zero crossing of the AC signal from said source, then switching said H-switch to said one ON state after a given delay and before the first successive next zero crossing of said AC signal, then switching said H-switch to said other ON state at said first successive zero crossing of said AC signal, then switching said H-switch to said one ON state after said given delay, then switching said H-switch to said other ON state at the second successive zero crossing of said AC signal, then switching said H-switch to said one ON state after said given delay, then switching said H-switch to said other ON state at the third successive zero crossing of said AC signal, and so on.

2. The invention according to claim 1 wherein said given delay equals approximately one fourth of a period of said AC source.

3. The invention according to claim 1, comprising cyclically switching said H-switch between said one ON state and said other ON state at twice the frequency of AC input signal zero crossings of said AC source, such that said fundamental frequency component voltage waveform in W2 is approximately 90° out of phase with the voltage waveform in W1.

4. A start-up control method for an AC motor control circuit having a first motor winding W1 connected to a pair of lower lines L1 and L2 supplied by an AC source, and having a second motor winding W2 connected by an H-switch to L1 and L2, said H-switch having one ON state connecting L1 to the left end of W2 and connecting L2 to the right end of W2, said H-switch having another ON state connecting L2 to the left end of W2 and connecting L1 to the right end of W2, said start-up control method comprising switching said H-switch from said one ON state to said other ON state at each zero crossing of the AC signal from said source, and switching said H-switch from said other to said one ON state after a given delay following each said zero crossing of said AC signal and before the next successive zero crossing of said AC signal, such that a first portion of the first half cycle waveform of said AC signal in W1 corresponds to an opposite-going first portion first half cycle chopped waveform in W2, the second portion of the first half cycle waveform of said AC signal in W1 corresponds to a like-going second portion first half cycle chopped waveform in W2, the first portion of the second half cycle waveform of said AC signal in W1 corresponds to an opposite-going first portion second half cycle chopped waveform in W2, and the second portion of the second half cycle waveform of said AC signal in W1 corresponds to a like-going second portion second half cycle chopped waveform in W2, whereby the second portion first and second half cycle chopped waveforms in W2 are the same as in W1, and the first portion first and second half cycle chopped waveforms in W2 are the inversions of the waveform in W1.

5. A start-up control method for an AC motor control circuit having a first motor winding W1 connected to a pair of power lines L1 and L2 supplied by an AC source, and having a second motor winding W2 connected by an H-switch to L1 and L2, said H-switch having one ON state connecting L1 to the left end of W2 and connecting L2 to the right end of W2, said H-switch having another ON state connecting L2 to the left end of W2 and connecting L1 to the right end of W2, said start-up control method comprising switching said H-switch between said one ON state and said other ON state at twice the frequency of AC input signal zero crossings of said AC source, such that the rising from zero first quarter waveform in W1 corresponds to a falling from zero first quarter chopped waveform in W2, the second quarter falling toward zero waveform in W1 corresponds to a falling toward zero second quarter chopped waveform in W2, the third quarter falling from zero waveform in W1 corresponds to a third quarter rising from zero chopped waveform in W2, and the fourth quarter rising towards zero waveform in W1 corresponds to a fourth quarter rising towards zero chopped waveform in W2, whereby the second and fourth quarter chopped waveforms in W2 are the same as in W1, and the first and third quarter chopped waveforms in W2 are the inversions of the waveform in W1.

6. A start-up control method for an AC motor control circuit having first and second motor control windings W1 and W2 connected respectively by first and second H-switches to a pair of power lines L1 and L2 supplied by an AC source, each H-switch having one ON state connecting L1 to the left end of its respective said winding and connecting L2 to the right end of its respective said winding, each H-switch having another ON state connecting L2 to said left end of its respective said winding and connecting L1 to the right end of its respective said winding, and each H-switch having an OFF state disconnecting its respective said winding from said AC source, said start-up control method comprising alternately switching said H-switches between said one ON state and said OFF state to yield a fundamental frequency component voltage waveform in W1 phase shifted from the fundamental frequency component voltage waveform in W2, and comprising switching said first H-switch to said one ON state and switching said second H-switch to said OFF state at a zero crossing of the AC signal from said source, then switching said first H-switch to said OFF state after a given delay and before the first successive next zero crossing of said AC signal, then switching said second H-switch to said one ON state after a further delay following said given delay and before said first successive next zero crossing of said AC signal, then switching said first H-switch to said one ON state and switching said second H-switch to said OFF state at said first successive zero crossing of said AC signal, then switching said first H-switch to said OFF state after said given delay, then switching said second H-switch to said one ON state after said further delay, then switching said first H-switch to said one ON state and switching said second H-switch to said OFF state at the second successive zero crossing of said AC signal, then switching said first H-switch to said OFF state after said given delay, then switching said second H-switch to said one ON state after said further delay, then switching said first H-switch to said one ON state and switching said second H-switch to said OFF state at the third successive zero crossing of said AC signal, and so on.

7. The invention according to claim 6 wherein said given delay is approximately 80° of a cycle of said AC source, and said further delay is approximately 20° of a cycle of said AC source, such that during a half cycle of said AC source W1 is energized for the first 80°, followed by 20° during which both of said H-switches are OFF, followed by energization of W2 for the remaining 80° of the half cycle, the resultant voltage waveform in W1 being phase shifted by 74° from the resultant voltage waveform in W2.

8. The invention according to claim 6 wherein said given delay is approximately 69° of a cycle of said AC source, and said further delay is approximately 42° of a cycle of said AC source, such that during a half cycle of said AC source W1 is energized for the first 69°, followed by 42° during which both H-switches are OFF, followed by energization of W2 for the remaining 60° of the half cycle, the resultant voltage waveform in W1 being phase shifted by approximately 90° from the resultant voltage waveform in W2.

9. The invention according to claim 6 wherein said given delay is approximately 90° of a cycle of said AC source, and said further delay is momentary such that during a half cycle of said AC source W1 is energized for approximately the first 90°, momentarily followed by energization of W2 for approximately the remaining 90° of the half cycle, the resultant voltage waveform in W1 being phase shifted by approximately 65° from the resultant voltage waveform in W2.

10. The invention according to claim 6 comprising switching and first H-switch from said one ON state to said OFF state in alternating opposition to switching said second H-switch from said OFF state to said one ON state.

11. The invention according to claim 10 comprising switching said first H-switch to said one ON state and switching said second H-switch to said OFF state at a zero crossing of the AC signal from said source, then switching said first H-switch to said OFF state and switching said second H-switch to said one ON state after a given delay and before the first successive next zero crossing of said AC signal, then switching said first H-switch to said one ON state and switching said second H-switch to said OFF state at said first successive zero crossing of said AC signal, then switching said first H-switch to said OFF state and switching said second H-switch to said one ON state after said given delay, then switching said first H-switch to said one ON state and switching said second H-switch to said OFF state at the second successive zero crossing of said AC signal, then switching said first H-switch to said OFF state and switching said second H-switch to said one ON state after said given delay, then switching said first H-switch to said one ON state and switchinhg said second H-switch to said OFF state at the third successive zero crossing of said AC signal, and so on.

12. The invention according to claim 11 wherein said given delay equals one fourth or less of a period of said AC source.

13. The invention according to claim 12 comprising cyclically switching said H-switches in opposition between said one ON state and said OFF state at twice the frequency of AC input signal zero crossings of said AC source.

14. A start-up control method for an AC motor control circuit having first and second motor control windings W1 and W2 connected respectively by first and second H-switches to a pair of power lines L1 and L2 supplied by an AC source, each H-switch being one ON state connecting L1 to the left end of its respective said winding and connecting L2 to the right end of its respective said winding, each H-switch having another ON state connecting L2 to said left end of its respective said winding and connecting L1 to said right end of its respective said winding, each H-switch having an OFF state disconnecting its respective said winding from said AC source, said start-up control method comprising switching said first H-switch to said one ON state and switching said second H-switch to said OFF state at each zero crossing of the AC signal from said source, and switching said first H-switch to said OFF state after a given delay following each said zero crossing of said AC signal and before the next successive zero crossing of said AC signal, and switching said second H-switch to said one ON state after a further delay following said given delay and before said next successive zero crossing of said AC signal, such that one portion of the first half cycle waveform of said AC signal corresponds to a like chopped waveform in W1, another portion of the first half cycle waveform of said AC signal corresponds to a like chopped waveform in W2, one portion of the second half cycle waveform of said AC signal corresponds to a like chopped waveform in W1, and another portion of the second half cycle waveform of said AC signal corresponds to a like chopped waveform in W2, whereby said one portions of the first and second half cycle waveforms of said AC signal are provided in W1, and said other portions of the first and second half cycle waveforms of said AC signal are provided in W2.

15. A start-up control method for an AC motor control circuit having first and second motor control windings W1 and W2 connected respectively by first and second H-switches to a pair of power lines L1 and L2 supplied by an AC source, each H-switch having one ON state connecting L1 to the left end of its respective said winding and connecting L2 to the right end of its respective said winding, each H-switch having another ON state connecting L2 to said left end of its respective said winding and connecting L1 to said right end of its respective said winding, each H-switch having an OFF state disconnecting its respective said winding from said AC source, said start-up control method comprising switching said first H-switch to said one ON state and switching said second H-switch to said OFF state at each zero crossing of the AC signal from said source, and switching said first H-switch to said OFF state and switching said second H-switch to said one ON state after a given delay following each said zero crossing of said AC signal and before the next successive zero crossing of said AC signal, such that the first portion of the first half cycle waveform of said AC signal corresponds to a like chopped waveform in W1, the second portion of the first half cycle waveform of said AC signal corresponds to a like chopped waveform in W2, the first portion of the second half cycle waveform of said AC signal corresponds to a like chopped waveform in W1, and the second portion of the second half cycle waveform of said AC signal corresponds to a like chopped waveform in W2, whereby the first portions of the first and second half cycle waveforms of said AC signal are provided in W1, and the second portions of the first and second half cycle waveforms of said AC signal are provided in W2.

16. A start-up control method for an AC motor control circuit having first and second motor control windings W1 and W2 connected respectively by first and second H-switches to a pair of power lines L1 and L2 supplied by an AC source, each H-switch having one ON state connecting L1 to the left end of its respective said winding and connecting L2 to the right end of its respective said winding, each H-switch having another ON state connecting L2 to said left end of its respective said winding and connecting L1 to said right end of its respective said winding, each H-switch having an OFF state disconnecting its respective said winding from said AC source, said start-up control method comprising switching said first H-switch between said one ON state and said OFF state at twice the frequency of AC input signal zero crossings of said AC source, and switching said second H-switch between said one ON state and said OFF state at twice the frequency of AC input signal zero crossings of said AC source such that said second H-switch is OFF when said first H-switch is in said one ON state and such that said second H-switch is in said one ON state when said first H-switch is OFF, such that the first quarter waveform in said AC signal corresponds to a like first quarter chopped waveform in W1, the second quarter waveform in said AC signal corresponds to a like second quarter chopped waveform in W2, the third quarter waveform in said AC signal corresponds to a like third quarter chopped waveform in W1, and the fourth quarter waveform in said AC signal corresponds to a like fourth quarter chopped waveform in W2, whereby the waveform in said AC signal is chopped into quarters and alternately distributed to W1 and W2.

17. AC motor control apparatus comprising:
a pair of power lines L1 and L2 supplied by an Ac source;
a first motor winding W1 connected to L1 and L2;
a second motor winding W2 connected by an H-switch to L1 and L2, said H-switch having one ON state connecting L1 to the left end of W2 and connecting L2 to the right end of W2, said H-switch having another ON state connecting L2 to the left end of W2 and connecting L1 to the right end of W2; and
start-up means comprising control means for alternately switching said H-switch between said one ON state and said other ON state, without energy-storage phasing capacitors or inductors, to yield a fundamental frequency component voltage waveform in W2 phase shifted from the voltage waveform in W1, wherein said H-switch is switched to said other ON state at a zero crossing of the AC signal from said source, then said H-switch is switched to said one ON state after a given delay and before the first successive next zero crossing of said AC signal, then said H-switch is switched to said other ON state at said first successive zero crossing of said AC signal, then said H-switch is switched to said one ON state after said given delay, then said H-switch is switched to said other ON state at the second successive zero crossing of said AC signal, then said H-switch is switched to said one ON state after said given delay, then said H-switch is switched to said other ON state at the third successive zero crossing of said AC signal, and so on.

18. The invention according to claim 17 wherein said given delay equals approximately one fourth of a period of said AC signal.

19. The invention according to claim 17 wherein said H-switch is cyclically switched between said one and said other ON states at twice the frequency of AC input signal zero crossings of said AC source, such that said fundamental frequency component voltage waveform in W2 is approximately 90° out of phase with the voltage waveform in W1.

20. AC motor control apparatus comprising:
a pair of power lines L1 and L2 supplied by an AC source;
a first motor winding W1 connected to L1 and L2;
a second motor winding W2 connected by an H-switch to L1 and L2, said H-switch having one ON state connecting L1 to the left end of W2 and connecting L2 to the right end of W2, said H-switch having another ON state connecting L2 to the left end of W2 and connecting L to the right end of W2; and
start-up means comprising control means for switching said H-switch from said one ON state to said other ON state at each zero crossing of the AC signal from said source, and for switching said H-switch from said other ON state to said one ON state after a given delay following each said zero crossing of said AC signal and before the next successive zero crossing of said AC signal, the first portion of the first half cycle waveform of said AC signal in W1 corresponding to an opposite-going first portion first half cycle chopped waveform in W2, the second portion of the first half cycle waveform of said AC signal in W1 corresponding to a like-going second portion first half cycle chopped waveform in W2, the first portion of the second half cycle waveform of said AC signal in W1 corresponding to an opposite-going first portion second half cycle chopped waveform in W2, the second portion of the second half cycle waveform of said AC signal in W1 corresponding to a like-going second portion second half cycle chopped waveform in W2, such that the second portions of the first and second half cycle waveforms are the same in W1 and W2, and the first portions of the first and second half cycle waveforms in W2 are the inversions of those in W1.

21. An AC motor control apparatus comprising:
a pair of power lines L1 and L2 supplied by an AC source;
a first motor winding W1 connected to L1 and L2;
a second motor winding W2 connected by an H-switch to L1 and L2, said H-switch having one ON state connecting L1 to the left end of W2 and connecting L2 to the right end of W2, said H-switch having another ON state connecting L2 to the left end of W2 and connecting L1 to the right end of W2; and
start-up means comprising control means for switching said H-switch between said one ON state and said other ON state at twice the frequency of AC input signal zero crossings of said AC source, the first quarter cycle waveform rising from zero in W1 corresponding to a first quarter cycle falling from zero chopped waveform in W2, the second quarter cycle falling toward zero waveform in W1 corresponding to a second quarter cycle falling toward zero chopped waveform in W2, the third quarter cycle falling from zero waveform in W1 corresponding to a third quarter cycle rising from zero chopped waveform in W2, and the fourth quarter cycle rising towards zero waveform in W1 corresponding to a fourth quarter cycle rising towards zero chopped waveform in W2, such that the second and fourth quarter cycle waveforms are the same in W1 and W2, and the first and third quarter cycle waveforms in W2 are the inversions of those in W1.

22. AC motor control apparatus comprising:
a pair of power lines L1 and L2 supplied by an AC power source;
first and second motor windings W1 and W2 connected respectively by first and second H-switches to L1 and L2, each H-switch having one ON state connecting L1 to the left end of its respective winding and connecting L2 to the right end of its respective said winding, each H-switch having another ON state connecting L2 to the left end of its respective said winding and connecting L1 to the right end of its respective said winding, each H-switch having an OFF state disconnecting its respective said winding from said AC source; and start-up means comprising control means for alternately switching said H-switches between said one ON state and said OFF state so as to yield a fundamental frequency component voltage waveform in W1 phase shifted from the fundamental frequency component voltage waveform in W2, wherein said first H-switch is switched to said one ON state and said second H-switch is switched to said OFF state at a zero crossing of the AC signal from said source, then said first H-switch is switched to said OFF state after a given delay and before the first successive next zero crossing of said AC signal, then said second H-switch is switched to said one ON state after a further delay and before said first successive next zero crossing of said AC signal, then said first H-switch is switched to said one ON state and said second H-switch is switched to said OFF state at said first successive next zero crossing of said AC signal, then said first H-switch is switched to said OFF state after said given delay, then said second H-switch is switched to said one ON state after said further delay, then said first H-switch is switched to said one ON state and said second H-switch is switched to said OFF state at the second successive zero crossing of said AC signal, then said first H-switch is switched to said OFF state after said given delay, then said second H-switch is switched to said one ON state after said further delay, then said first H-switch is switched to said one ON state and said second H-switch is switched to said OFF state at the third successive zero crossing of said AC signal, and so on.

23. The invention according to claim 22 wherein said given delay is approximately 80° of a cycle of said AC source, and said further delay is approximately 20° of a cycle of said AC source, such that during a half cycle of said AC source W1 is energized for the first 80°, followed by 20° during which both H-switches are OFF, followed by energization of W2 for the remaining 80° of the half cycle, the resultant voltage waveform in W1 being phase shifted by about 74° from the resultant voltage waveform in W2.

24. The invention according to claim 22 wherein said given delay is approximately 69° of a cycle of said AC source, and said further delay is approximately 42° of a cycle of said AC source, such that during a half cycle of said AC source W1 is energized for the first 69°, followed by 42° during which both H-switches are OFF, followed by energization of W2 for the remaining 69° of the half cycle, the resultant voltage waveform in W1 being phase shifted by about 90° from the resultant voltage waveform in W2.

25. The invention according to claim 22 wherein said given delay is approximately 90° of a cycle of said AC source, and said further delay is momentary such that during a half cycle of said AC source W1 is energized for approximately the first 90°, followed by a momentary delay during which both H-switches are OFF, followed by energization of W2 for approximately the remaining 90° of the half cycle, the resultant voltage waveform in W1 being phase shifted by about 65° from the resultant voltage waveform in W2.

26. The invention according to clim 22 wherein said first H-switch switches from said one ON state to said OFF state in alternating opposition to said second H-switch switching from said OFF state to said one ON state.

27. The invention according to caim 26 wherein said first H-switch is switched to said one ON state and said second H-switch is switched to said OFF state at a zero crossing of the AC signal from said source, then said first H-switch is switched to said OFF state and said second H-switch is switched to said one ON state after a given delay and before the first successive next zero crossing of said AC signal, then said first H-switch is switched to said one ON state and said second H-switch is switched to said OFF state at said first successive zero crossing of said AC signal, then said first H-switch is switched to said OFF state and said second H-switch is switched to said one ON state after said given delay, then said first H-switch is switched to said one ON state and said second H-switch is switched to said OFF state at the second successive zero crossing of said AC signal, then said first H-switch is switched to said OFF state and said second H-switch is switched to said one ON state after said given delay, then said first H-switch is switched to said one ON state and said second H-switch is switched to said OFF state at the third successive zero crossing of said AC signal, and so on.

28. The invention according to claim 27 wherein said given delay equals one fourth or less of a period of said AC source.

29. The invention according to claim 27 wherein said H-switches switch alternately and cyclically at twice the frequency of AC input signal zero crossings of said AC source.

30. An AC motor control apparatus comprising:
a pair of power lines L1 and L2 supplied by an Ac source;
first and second motor windings W1 and W2 connected respectively by said first and second H-switches to L1 and L2, each H-switch having one ON state connecting L1 to the left end of its respective said winding and connecting L2 to the right end of its respective said winding, each H-switch having another ON state connecting L2 to the left end of its respective said winding and connecting L1 to the right end of its respective said winding, each H-switch having an OFF state disconnecting its respective said winding from said AC source; and
start-up means comprising control means for switching said first H-switch to said one ON state and said second H-switch to said OFF state at each zer crossing of the AC signal from said source, and for switching said first H-switch to said OFF state after a given delay following each said zero crossing of said AC signal and before the next successive zero crossing of said AC signal, and for switching said second H-switch to said one ON state after a further delay and before said next successive zero crossing of said AC signal, one portion of the first half cycle waveform of said AC signal corresponding to a like chopped waveform in W1, another portion of the first half cycle waveform of said AC signal corresponding to a like chopped waveform in W2, one portion of the second half cycle waveform of said AC signal corresponding to a like chopped waveform in W1, another portion of the second half cycle waveform of said AC signal corresponding to a like chopped waveform in W2, whereby said one portions of the first and second half cycles of said AC signal are provided in W1, and said other portions of the first and second half cycles of said AC signal are provided in W2.

31. AC motor control apparatus comprising:

a pair of power lines L1 and L2 supplied by an AC source;

first and second motor windings W1 and W2 connected respectively by said first and second H-switches to L1 and L2, each H-switch having one ON state connecting L1 to the left end of its respective said winding and connecting L2 to the right end of its respective said winding, each H-switch having another ON state connecting L2 to the left end of its respective said winding and connecting L1 to the right end of its respective said winding, each H-switch having an OFF state disconnecting its respective said winding from said AC source; and start-up means comprising control means for switching said first H-switch to said one ON state and said second H-switch to said OFF state at each zero crossing of the AC signal from said source, and for switching said first H-switch to said OFF state and switching said second H-switch to said one ON state after a given delay following each said zero crossing of said AC signal and before the next successive zero crossing of said AC signal, the first portion of the first half cycle waveform of said AC signal corresponding to a first portion first half cycle chopped waveform in W1, the second portion of the first half cycle waveform of said AC signal corresponding to a second portion first half cycle chopped waveform in W2, the first portion of the second half cycle waveform of said AC signal corresponding to a first portion second half cycle chopped waveform in W1, the second portion of the second half cycle waveform of said AC signal corresponding to a second portion second half cycle chopped waveform in W2, whereby the first portions of the first and second half cycles of said AC signal are provided in W1, and the second portions of the first and second half cycles of said AC signal are provided in W2.

32. AC motor control apparatus comprising:

a pair of power lines L1 and L2 supplied by an AC source;

first and second motor windings W1 and W2 connected respectively by first and second H-switches to L1 and l2, each H-switch having one ON state connecting L1 to the left end of its respective said winding and connecting L2 to the right end of its respective said winding, each H-switch having another ON state connecting L2 to the left end of its respective said winding and connecting L1 to the right end of its respective said winding, each H-switch having an OFF state disconnecting its respective said winding from said AC source; and start-up means comprising control means for switching said first H-switch between said one ON state and said OFF state at twice the frequency of AC input signal zero crossings of said AC source, and switching said second H-switch between said one ON state and said OFF state at twice said frequency of AC input signal zero crossings of said AC source such that said second H-switch is OFF when said first H-switch is in said one ON state and such that said second H-switch is in said one ON state when said first H-switch is OFF, the first quarter waveform of said AC signal corresponding to a first quarter chopped waveform in W1, the second quarter waveform in said AC signal corresponding to a second quarter chopped waveform in W2, the third quarter waveform in said AC signal corresponding to a third quarter chopped waveform in W1, the fourth quarter waveform in said AC signal corresponding to a fourth quarter chopped waveform in W2, whereby said AC signal is chopped into quarters and alternately distributed to W1 and W2.

* * * * *

UNITED STATES PATENT AND TRADEMARK OFFICE
CERTIFICATE OF CORRECTION

PATENT NO. : 4,459,532

DATED : July 10, 1984

INVENTOR(S) : HERMAN P. SCHUTTEN ET AL

It is certified that error appears in the above-identified patent and that said Letters Patent is hereby corrected as shown below:

In Column 1, line 59, cancel "16" and insert --6--.

In Column 1, line 63, cancel "16" and insert --6--.

In Claim 4, column 7, line 1, cancel "lower" and insert --power--.

In Claim 8, column 8, line 58, cancel "60°" and insert --69°--.

In Claim 10, column 9, line 4, cancel "and" and insert --said--.

In Claim 11, column 9, line 27, cancel "switchinhg" and insert --switching--.

In Claim 14, column 9, line 42, cancel "being" and insert --having--.

In Claim 17, column 11, line 13, cancel "Ac" and insert --AC--.

In Claim 19, column 11, line 64, cancel "L" and insert --L1--.

In Claim 26, column 13, line 64, cancel "clim" and insert --claim--.

In Claim 27, column 14, line 1, cancel "caim" and insert --claim--.

UNITED STATES PATENT AND TRADEMARK OFFICE
CERTIFICATE OF CORRECTION

PATENT NO. : 4,459,532

DATED : July 10, 1984

INVENTOR(S) : HERMAN P. SCHUTTEN ET AL

It is certified that error appears in the above-identified patent and that said Letters Patent is hereby corrected as shown below:

In Claim 30, column 14, line 31, cancel "Ac" and insert --AC--.

In Claim 30, column 14, line 47, cancel "zer" and insert --zero--.

In Claim 32, column 16, line 8, cancel "12" and insert --L2--.

Signed and Sealed this

Twentieth Day of August 1985

[SEAL]

Attest:

DONALD J. QUIGG

Attesting Officer

Acting Commissioner of Patents and Trademarks